United States Patent [19]

Fukahori et al.

[11] 4,304,480
[45] Dec. 8, 1981

[54] MOTOR DRIVE CAMERA WITH SYNCHRONIZATION SYSTEM

[75] Inventors: Hidehiko Fukahori, Kawasaki; Yukio Mashimo, Tokyo; Tomonori Iwashita, Fuchu, all of Japan

[73] Assignee: Canon Kabushiki Kaisha, Tokyo, Japan

[21] Appl. No.: 954,163

[22] Filed: Oct. 24, 1978

[30] Foreign Application Priority Data

Nov. 5, 1977 [JP] Japan ................ 52/132846

[51] Int. Cl.³ .................... G03B 1/18; G03B 17/18; B65H 25/30
[52] U.S. Cl. ............................ 354/173; 354/214; 354/289; 242/186; 226/11
[58] Field of Search ............... 354/171, 173, 206, 289, 354/212–214; 352/170, 171, 173–176, 180, 124, 125; 242/186, 191; 226/11, 43; 360/74.1, 74.2

[56] References Cited

U.S. PATENT DOCUMENTS

| | | | |
|---|---|---|---|
| 3,519,340 | 7/1970 | Vockenhuber et al. | 352/171 |
| 3,564,219 | 2/1971 | Mutziger | 242/186 X |
| 3,834,648 | 9/1974 | Rose, Jr. et al. | 242/186 |
| 3,915,407 | 10/1975 | Laydowicz et al. | 242/191 X |
| 3,949,856 | 4/1976 | Ulber et al. | 226/11 X |
| 3,999,197 | 12/1976 | Iwashita et al. | 354/173 |
| 4,001,552 | 1/1977 | Muller | 242/191 X |

FOREIGN PATENT DOCUMENTS 50-116027  9/1975  Japan .

*Primary Examiner*—L. T. Hix
*Assistant Examiner*—William B. Perkey
*Attorney, Agent, or Firm*—Toren, McGeady & Stanger

[57] ABSTRACT

A film advance error detection system for synchronizing the operation of shutter cocking and film winding mechanisms with a motor drive unit therefor. This system utilizes three transducers positioned adjacent the sprocket wheel, film perforations and rewinding spindle to pick up signals whose frequencies are related to their speeds. By processing the signals in combination with an output signal of a phase difference compensator, it is made possible to provide, in a selective manner, a display representative of the film advane error and reeling end in the winding and rewinding operations along with the automatic stoppage of rotation of the motor.

17 Claims, 16 Drawing Figures

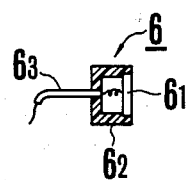

FIG.11
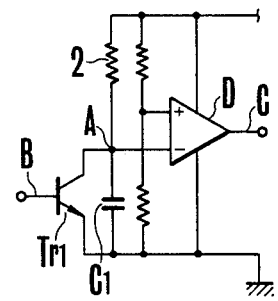
FIG.12
(A) VOLTAGE AT A FIG. 11
(B) OUTPUT OF PULSE SHAPER IN FIG. 10
(C) OUTPUT OF THRESHOLD CIRCUIT IN FIG. 10
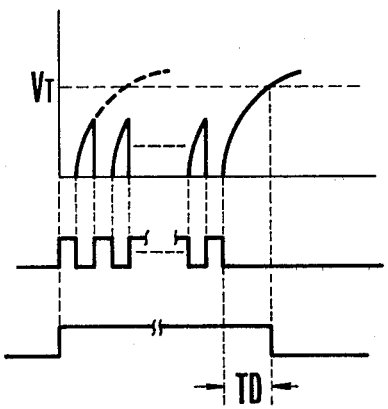
FIG.13
| LED135 | RETARD |
| LED134 | LATCH |
| LED136 | BLANK | ← | REWINDING END |

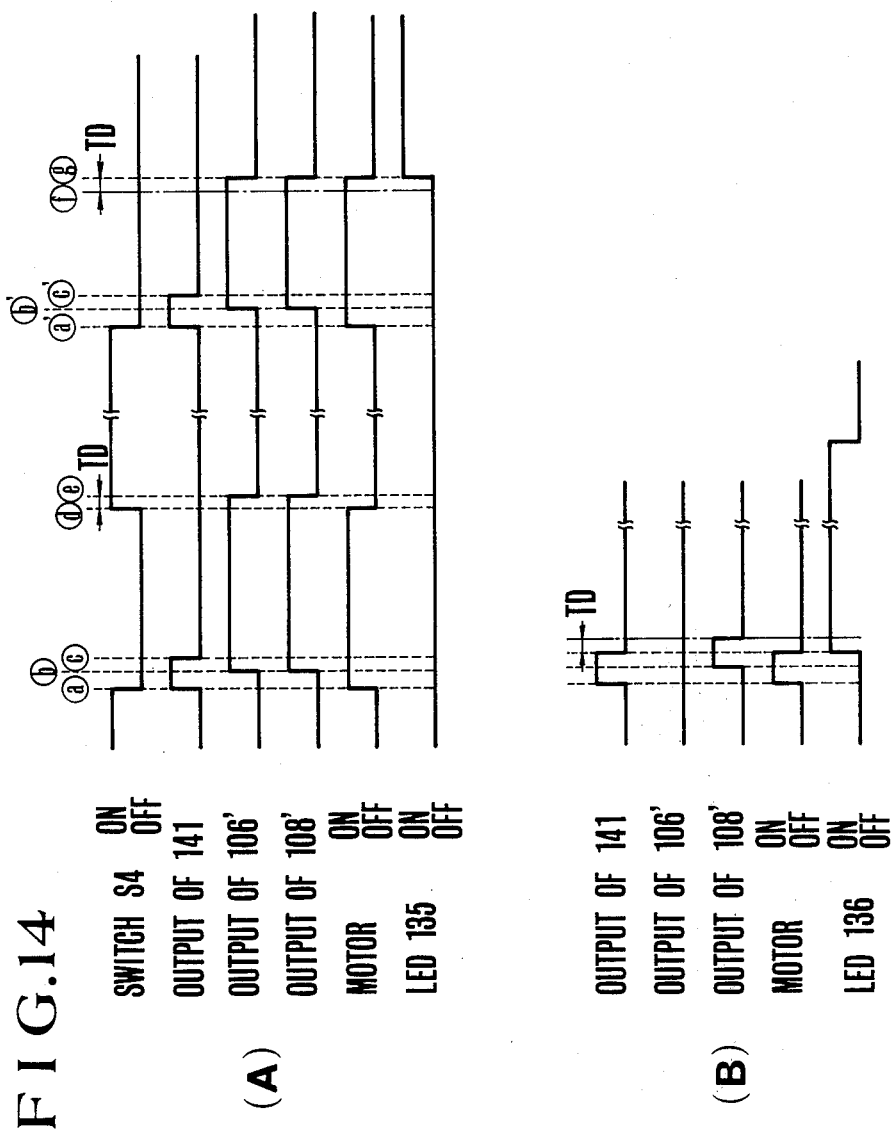

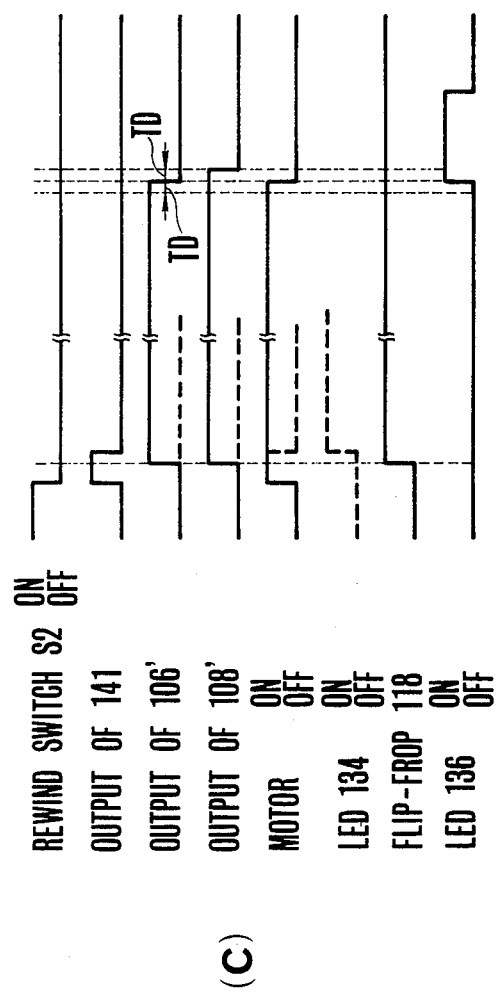

MOTOR DRIVE CAMERA WITH SYNCHRONIZATION SYSTEM

FIELD OF THE INVENTION

This invention relates to improvements in control systmes for motor driven cameras and, more particularly, to devices for controlling intermittent advancement of a photographic film in synchronism with periodic operation of a motor drive unit upon detection of a speed or phase error to stop rotation of the motor and to provide a corresponding display.

BACKGROUND OF THE INVENTION

Conventional systems for controlling the synchronization of a camera and a motor drive unit generally lack the capability to detect abnormal movement of film within the camera. This synchronization between the film winding mechanism and the motor drive unit has been assumed to be equivalent to that between the film and the film winding mechanism. In practice, however, one cycle of normal film winding operation does not always lead to advancement of the film by exaclty one frame. Accordingly, the mere detection of whether or not the precise synchronization between the film winding mechanism and the motor drive unit is established cannot ensure the exact advancement of the film. Aside from the attainment of proper phase synchronization between the film winding mechanism and the motor drive unit, the system is required to be capable of ensuring proper speed synchronization between the film and the film winding mechanism.

In the latter connection, it should be explained that when the film slips or jams at the take-up spool, for example, there is a likely possibility that idle rotation of the sprocket will occur which results in none of the film being advanced. In these circumstances, the camera will nevertheless be ready for the next frame exposure because of the complition of one cycle of winding operation.

Another problem occurs when the film winding mechanism is no longer effective to advance the film through the full lenght of one frame due to the completion of exposures of all of the available frame areas; an excessive tension is exerted on the film and the sprocket teeth may damage the film perforations. Upon occurrence of the prescribed amount of rotation of the sprocket, the camera is set to the cocked position at which the shutter is ready for the next exposure. This occurs despite the lack of availability of a fresh film area of sufficient format. It is clear that mere detection of whether or not the motor drive unit moves the camera mechanism through one cycle of operation is inadequate in controlling the synchronization of the shutter cocking and film winding mechanisms with the motor drive unit.

SUMMARY OF THE INVENTION

Accordingly, it is an object of the present invention to provide a system for controlling the operation of a camera and a motor drive unit which overcomes the above-mentioned conventional drawbacks.

It is another object of the present invention to provide a systme for ensuring accurate and reliable synchronization between the photographic film and the electrically operated film drive control by detecting not only a phase error between the drive motor and the motor driven mechanisms, but also a speed error between the mechanism and the film.

A further object of the present invention is to provide a system responsive to the detection of a phase or speed error for stopping rotation of the electric motor and for providing, in a selective manner, a display representative of "film blank", "speed down" or "reeling end", and completion of rewinding operation with a necessary film tap left unwound, depending upon the occurrence of several conditions.

Briefly, the present invention makes use of at least two transducers, one of which is positioned adjacent the film drive mechanism and another transducer which is positioned adjacent the film perforations in combination with a single-pulse generator which is capable of producing a motor drive control pulse of duration sufficiently long to compensate for a phase difference between the drive motor and the film drive mechanism. The signals picked up by these transducers are supplied to the respective inputs of pulse forming circuits which convert them to trains of pulses of frequencies related to the speeds of the film drive mechanism and the film respectively. The pulse trains are applied to respective threshold circuits which will produce an output of binary "1" level only when the frequency of the pulse train is greater than a preselected value. The outputs of the threshold circuits and the generator are processed by coincidence or logic circuit techniques to control energization and de-energization of the motor along with light-emitting diodes as warning signal display elements. With this system, it is further made possible to effect automatic stoppage of operation of the motor driven camera at the time when all the available film frames have been exposed. By providing an additional transducer positioned adjacent a rewinding control spindle, the rewinding operation is automatically stopped without causing a film tap to enter the film patrone completely.

For a better understanding of the present invention together with other and further objects thereof, reference is made to the following description and accompanying drawings, while the scope of the invention will be pointed out in the appended claims.

BRIEF DESCRIPTION OF THE DRAWINGS

FIG. 11 is a diagram of an example of the threshold circuit of FIG. 10.

FIG. 12 is a diagram of voltage variation at an input and an output of a comparator of FIG. 10 with input pulse train.

FIG. 13 shows an example of a display with warning indicia on respective windows for the light-emitting diodes of FIG. 10.

FIGS. 14A, 14B and 14C are timing charts illustrating the time sequence of events occurring in the circuit of FIG. 10 when in the normal and abnormal film advance cycles and in the normal rewinding operation with automatic stoppage control respectively.

DESCRIPTION OF THE PREFERRED EMBODIMENTS

Figure 1:
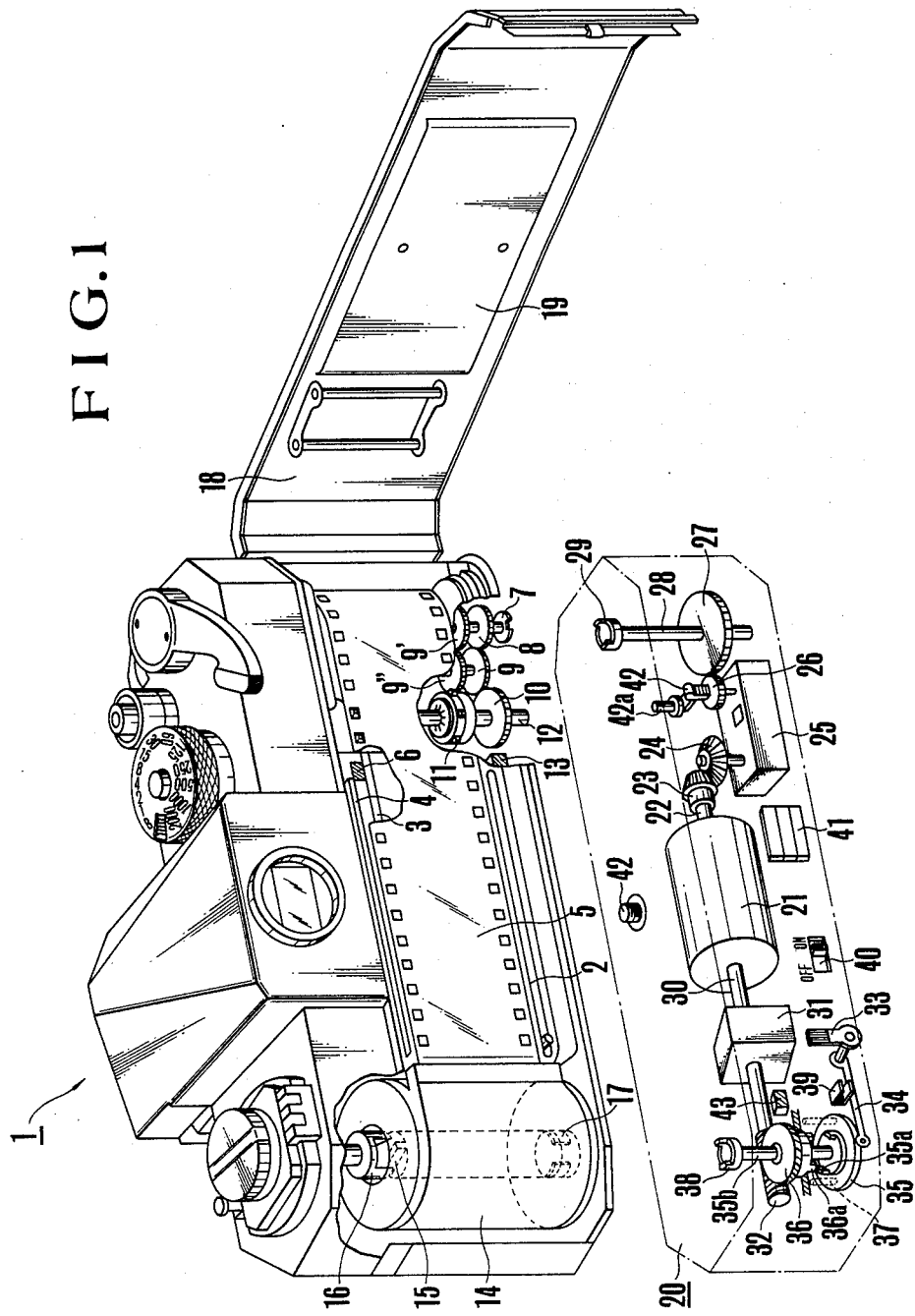
FIG. 1 is a perspective view of a single lens reflex camera with a back cover open and a cooperative motor drive unit without a housing, parts of a camera housing and an associated film being cut away to illustrate the relative positions of transducers to the film and the film winding and shutter cocking mechanism.

Referring to FIG. 1, the present invention is shown as applied to a motor driven camera having a synchronization system for the operation of a film winding and shutter cocking mechanism and a drive mechanism including an electric motor. A camera body 1 has a pair of lower film guide rails, the outside one of which is indicated at 2, and a pair of upper guide rails 3 and 4 for inside and outside respectively. These guides define a path along which a film 5 is transported from a supply chamber to a take-up chamber, or vice versa.

The film winding mechanism includes a coupler 7 arranged to engage with a spindle 29 in a motor drive unit 20 when the latter is attached to the camera body 1, and fixedly connected to a drive shaft (not shown) at the bottom end, and a gear train. The gear train begins with a gear 8 fixedly connected to the drive shaft and terminates at a gear 10 operatively connected to a sprocket wheel 11 through a shaft 12. Shaft 12 is accessible at the bottom end from the outside of the camera housing to control rewinding operation of the film 5. The take-up chamber accommodates a spool (not shown) frictionally connected to a shaft (not shown) of a gear 9' meshing with a gear 9''. Gear 9'' meshes with the intermediate gear 9'. The gear 9'' constitutes part of a shutter cocking mechanism (not shown). The construction of the film winding and shutter cocking mechanism is not essential for explanation of the principles of the present invention. Therefore, the other parts, of such mechanism which also may be of known construction, are omitted.

The motor drive unit 20 includes an electric reversible motor 21, the motion of which is transmitted to either the winding mechanism or a supply spool 17 in a film patrone 14 through respective intermediaries depending upon the direction of rotation of a rotor (not shown) in the motor housing. Two one-way clutches are provided between the rotor and respective output shafts 22 and 30 for forward and reverse rotations respectively. The forward motion transmitting mechanism includes a bevel gear 23 fixedly connected to the output shaft 22, which gear meshes with a bevel gear 24 of a speed reduction device 25, and a gear 27 fixedly connected to a shaft 28 for the above-mentioned first spindle 29 and with a gear 26 of the speed reduction device 25.

To switch the unit 20 from the winding to the rewinding mode, the operator needs at first to move upward a knob 42 so that the sprocket shaft 12 is pushed upward by a pin 44, thus making the sprocket 11 free. Then, the operator will turn a lever 33, which is also accessible from the outside of the unit housing as is knob 42, to the right as viewed in FIG. 1. A switch 39 (corresponding to S2 in FIG. 10) is consequently closed by an arm 34 on a common shaft of the lever 33 to reverse the direction of rotation of the motor 21. While motion of the motor 21 is transmitted from the output shaft 30 through a speed reduction device 31 to a worm gear 32 which always meshes with a gear 36 freely rotatable about a shaft 35b of a clutch disc 35, such clockwise movement of the lever 33 also causes upward movement of the clutch disc 35 against the force of a spring 37. Thus, the clutch disc 35 is mated with another disc 36a fixedly mounted on the gear 36, and a second or rewinding spindle 38 on the top end of a shaft 35b of the disc 35 is brought into driving engagement with a hub of the supply spool 17. In this manner, motion of the motor 21 is transmitted to the supply spool 17.

Figure 2:
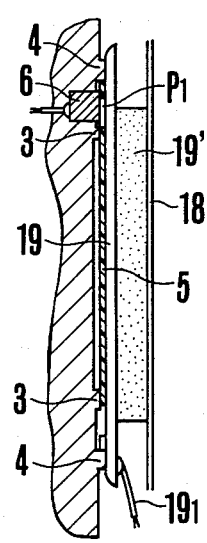
FIGS. 2 and 3 are sectional views of a fragment of the camera body with one of the transducers which is adapted to be placed in lateral alignment with the film perforations being illustrated for structure and function, and with the film in two operative positions where a perforation is in and out of alignment with the transducer respectively.
Figure 3:
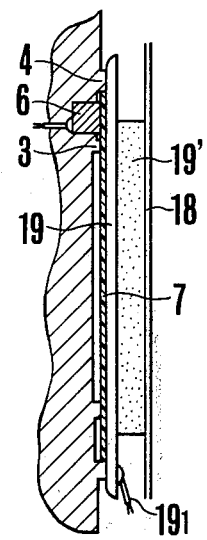
Figure 8:
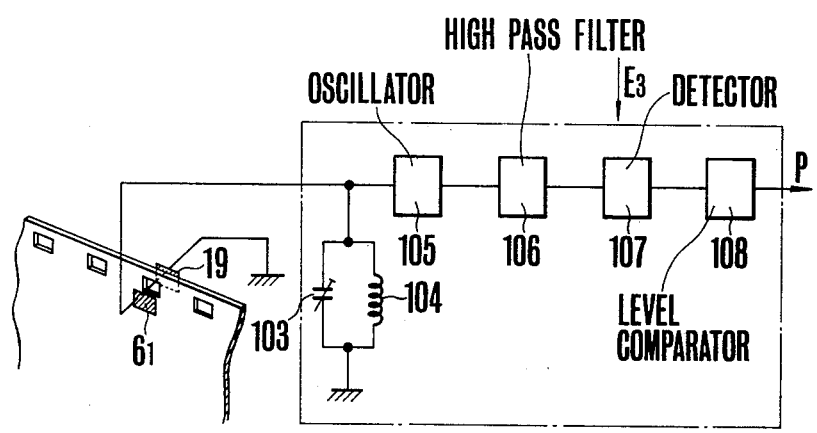
FIG. 8 is a schematic block diagram of the film speed detecting transducer associated with a pulse shaper circuit.

A first transducer 6 is located at a point between the inside and outside rails 3 and 4 of the upper film guide and between the sprocket and a line passing through the right border of a rectangular framing aperture (not shown) to detect the presence of sprocket holes in the film 5. This transducer 6 is constructed in the form of a capacitor as shown in FIGS. 2 and 3 and is connected to a CL resonator (see FIG. 8). In FIGS. 2 and 3, the capacitor 6 includes a conductive metal plate $6_1$ for contacting with the film 5, an electrically insulating case $6_2$ fixedly carrying the electrode $6_1$ and, buried in the wall of the framing aperture plate (not shown), a cable $6_3$ connected to the electrode $6_1$ at one end thereof. The opposite end of the cable $6_3$ is connected to a junction point between an adjustable capacitance 103 and an inductance 104 in FIG. 8, and an opposite electrode that is a film pressure plate 19 which is grounded by a lead $19_1$. The pressure plate 19 is mounted through a leaf spring 19' and through an electric insulator to the back cover 18 of the camera.

Figure 9:
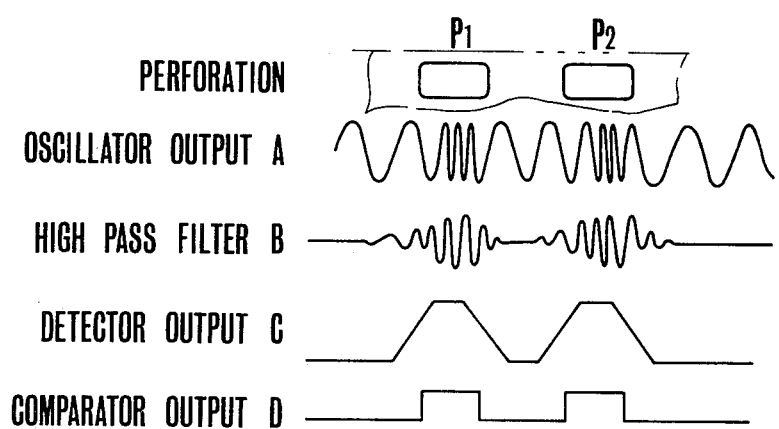
FIG. 9 is a diagram illustrating the various waveforms present in the circuit of FIG. 8 as a function of film perforations.

With reference to FIG. 9, when a first perforation $P_1$ passes across the transducer 6 as shown in FIG. 2, the electrostatic capacity becomes smaller than that when the film material is inserted into a space between the electrodes $6_1$ and 19, so that the frequency of an output of an oscillator 105 is increased as shown on line A in FIG. 9. The oscillator output A is supplied to a high pass filter 106 which allows a signal of higher frequency representative of the perforation $P_1$ to pass therethrough to a detector 107 as shown on line B in FIG. 9. As the film 5 is moved at a particular speed, the detector 107 produces a train of pulses having trapezoidal waveform at a frequency which is related to the film speed as shown on line C. A level comparator 108 converts the trapezoidal waveform to a rectangular waveform as shown in line D.

Turning again to FIG. 1, second and third transducers 13 and 43 are shown as positioned adjacent the sprocket drive control gear 10 and rewind control gear 36 respectively to pick up signals whose frequencies are related to the speed of the film winding and rewinding mechanisms. Each of these transducers 13 and 43 is constructed in an electromagnetic pick-up form as shown in FIGS. 4 to 6, or in an optical form as shown in FIG. 7.

Figure 4:
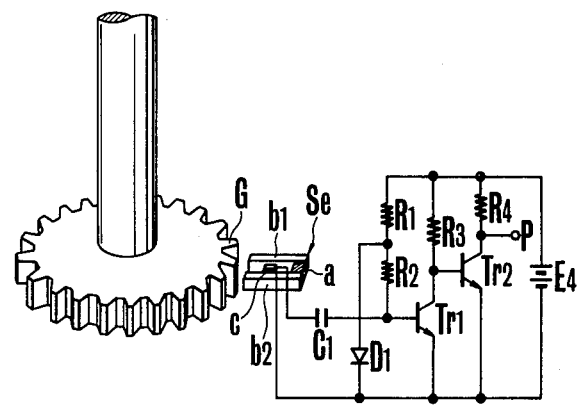
FIGS. 4 to 7 are schematic views of four different types of transducers adapted to be placed against the teeth of a sprocket control gear and of two examples of amplifier and pulse shaper circuits cooperative with the transducer.

In FIG. 4, G denotes any one of the gears adjacent transducers 13 and 43. The transducer which is indicated at Se includes a permanent magnet, a, interconnecting two yokes, b1 and b2, at their one ends, the opposite ends of the yokes being arranged in radial alignment with the gear G and adjacent the path of the teeth of the gear G. Accordingly, upon rotation of the gear G, the magnetic flux periodically varies in the space between the yokes b1 and b2 with generation of an alternating current in a coil c, therebetween. The coil c is connected at one end to the negative terminal of a battery E4 and at the other end to an input of a pulse shaper circuit through a condenser C1. The pulse shaper circuit includes a diode D1 with the anode connected to a point of connection between resistors R1 and R2, a first transistor Tr1 with a base connected to a junction between the resistor R2 and the condenser C1, with an emitter connected to the negative terminal of the battery E4 and with a collector connected through a resistor R3 to the positive terminal of the battery E4. The pulse shaper circuit also includes a second transistor Tr2 with a base connected to the collector of the transistor Tr1, with an emitter connected to the negative bus, and with a collector connected through a resistor R4 to the positive bus. An output terminal P is connected to the collector of the transistor Tr2, and at which appears a pulse train having a frequency proportional to the number of gear teeth passed across the transducer Se within a given time unit, that is, to the speed of the gear G.

Figure 5:
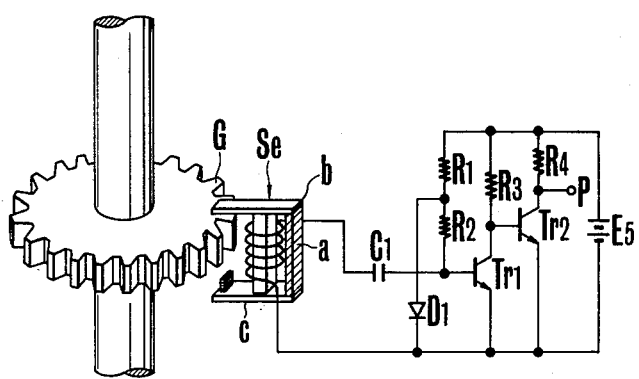
Figure 6:
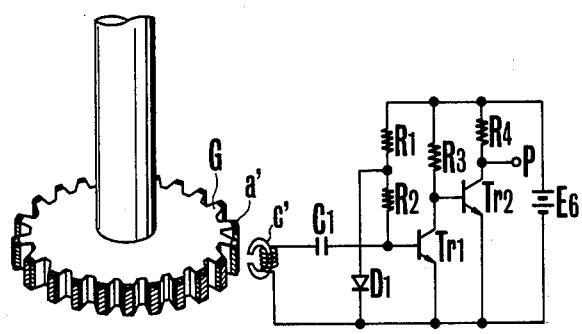

The orientation of the axis of the coil may be changed from the parallel to the perpendicular direction with respect to the gear plane as shown in FIG. 5. FIG. 6 shows an example of modification of the construction of the transducer Se where each of the gear teeth is magnetized at the top portion thereof, and the core for the coil c is curved so as to form a letter C. The pulse shaper circuits of FIGS. 5 and 6 are similar in construction to that of FIG. 4. Diode D1 functions to apply a base bias to the first transistor Tr1. When the first transistor Tr1 is truned on, the second transistor Tr2 is turned off.

Figure 7:
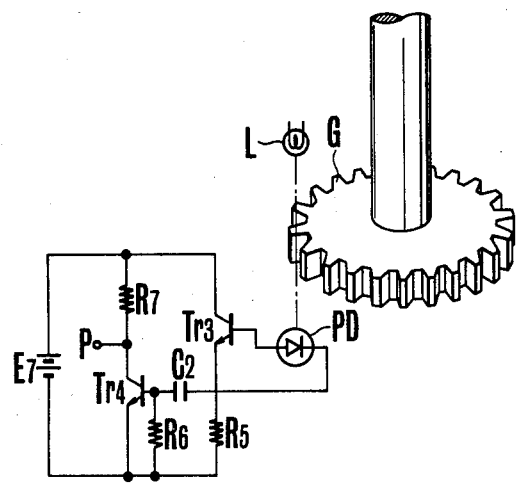

The optical form of the transducer Se is shown in FIG. 7, where a light source or lamp L and a photo-sensitive element or photo-diode PD are positioned on the opposite side of the gear G, and a line passing through the lamp L and photo PD is almost perpendicular to the gear plane and is cut by any one of the gear teeth as the gear G rotates. A pulse shaper circuit for the transducer includes a first transistor Tr3 with a base connected to the anode of the diode PD, with a collector connected to the positive terminal of a battery E7, and an emitter connected through a resistor R5 to the negative terminal of the battery E7. The pulse shaper circuit also includes a second transistor Tr4 with a base connected to a junction between a condenser C2 and a resistor R6, the opposite pole of the condenser C2 being connected to the cathode of the diode PD. An output terminal P is connected to the collector of the second transistor Tr4.

Figure 10:
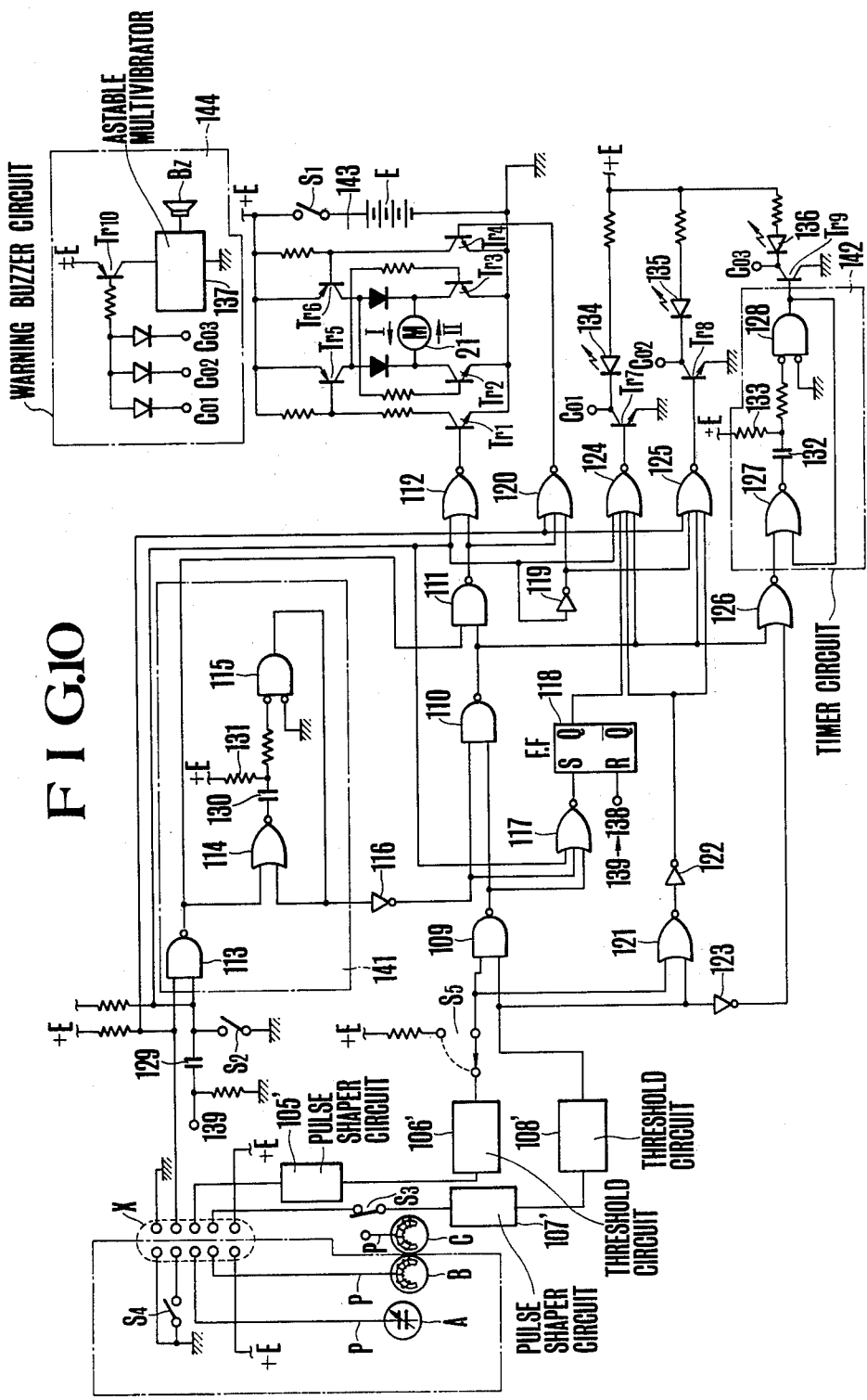
FIG. 10 is a schematic electrical circuit diagram, partly in block form, of one embodiment of a synchronization control system according to the present invention.

Referring to FIGS. 10 and 11, there is shown one embodiment of an electrical circuit for ensuring accurate and reliable synchronization between the film winding or rewinding and the motor operated driving device according to the present invention. The first and second transducers 6 and 13 incorporated in the camera body 1 of FIG. 1 are indicated at A and B respectively within a dot-and-dash line block, and the third transducer 43 which is incorporated in the unit 20 is indicated at C. Th signals from the transducers A and B are transmitted by electrical contact between a pair of interconnection terminal assemblies X from the camera body 1 to the unit 20 in which there is provided a coincidence gating or logic circuit for controlling the operation of the drive motor 21 and a display of film winding or rewinding error information by one of three light-emitting diodes 134, 135 and 136. The first diode 134 is selected to light up when the lever 33 of FIG. 1 is turned clockwise to close the switch S2 before the rewind control button 12 is moved upward by operating the knob 42. The second diode 135 will light up when the film 5 is retarded due to the faulty operation of the supply reel 17, or to the reeling end. The Third diode 136 is lighted up for a predetermined time controlled by a circuit 142 to indicate either (1) that with the camera set in the winding mode, advancement of the film 5 through the full length of one frame is not assured because of the slippage of the film end at the take-up spool or the lack of driving engagement of the sprocket 11 with the film 5 due to the damage of some of the perforations, for example, at the reeling end; or (2) that in the rewinding mode, rotation of the motor 21 is automatically stopped at the time of completion of rewinding operation with a film end portion being left unwound on the supply spool to facilitate later processing of the film 5. Such optical display elements 134 to 136 may be replaced by, or combined with a buzzer BZ and a control circuit therefor shown in a dot-and-dash line block 144.

To synchronize a shutter control mechanism (not shown) and a motor drive control circuit 143, there is provided a switch S4 arranged in the camera body 1 to be closed when the shutter is closed and to be opened when each cycle of film winding operation is completed while simultaneously setting the shutter to the cocked position. When a main switch S1 is closed by operating a control knob 40 (FIG. 1), as the shutter mechanism remains in its run-down position where the switch S4 is closed, the motor 21 starts to rotate in a forward or reverse direction depending upon the opening or closing of the switch S2 respectively. The period of preliminary actuation of the motor control circuit 143 is controlled by a phase difference compensator 141 enclosed in a dot-and-dash line block. In the latter connection, it should be explained that the start of rotation of the motor 21 is not immediately followed by the attainment of the film speed to a threshold level, but after a few milliseconds based on the assumption that the film advance cycle is normal. For this purpose, the phase difference compensator 141 is in the form of a pulse shaper circuit for producing a single pulse of duration equal to about twice the above-indicated time lag for one actuation of the motor control circuit 143.

In the film winding mode, since the switch S2 is previously open, the switch S4 functions to produce an actuating signal which is applied through a NOR gate 120 to the base of a transistor Tr4 in the motor control circuit 143, therby the transistor Tr4 and additional two transistors Tr6 and Tr2 are brought into conduction in sequence. Such conduction of the transistors Tr6 and Tr2 causes a current to flow through a motor winding M in a direction indicated by an arrow I so that the motor 21 rotates in the forward direction. With the switch S2 open, a signal of binary "I" level appears at a junction between the switch S2 and a resistor between the positive bus +E and circuit ground and is applied through a NOR gate 112 to the base of a transistor Tr1 in the motor control circuit 143. The transistor Tr1 and additional two transistors Tr5 and Tr3 are thus maintained in the non-conducting state. This "1" signal is also applied through a NOR gate 124 to the base of a switching transistor Tr7 for the light-emitting diode 134. This causes the light-emitting diode 134 to be cut off from coordination with the light-emitting diode 135.

With reference to the timing chart of FIG. 14A, when the shutter has run down to close switch S4 at a point (a) in time, the first-named signal which is of binary "0" level appears at an input of a NAND gate 113 in the single-pulse shaper circuit 141, while the second-named signal having a "1" level appears at the other input of NAND gate 113. Accordingly, the NAND gate 113 produces a "1" output which is connected to an input of an OR gate 114. At this time (a), a timing capacitor 130 starts to be charged through a resistor 131 from the battery E. After the elapse of a time interval equal to a time constant RC, a AND gate 115 changes its output from a "1" to a "0" level at a point (c) in time as shown on a second line in FIG. 14A.

Now assuming that the speeds of the film 5 and the sprocket wheel 11 reach a threshold level simultaneously at a point (b) in time between the points (a) and (c), as the signals from the transducers A and B are processed through their respective pulse shaper circuits 105' and 107' and through respective threshold circuits 106' and 108' (whose construction and operation are shown in FIGS. 11 and 12 respectively), then a NAND gate 109 changes its output from a "1" to a "0" level. This "0" level is combined with the "0" output of an inverter 116 by a NAND gate 110 to produce a "1" output. Responsive to the two "1" outputs of NAND gates 110 and 113, a NAND gate 111 produces a "0" output which is applied to the NOR gate 120 so that the motor winding M is maintained energized after the point (c) in time since the change of the output of the AND gate 115 to the "1" level does not cause change of the output of the NAND gate 111 to a "1" level. At a time point (d), one normal film advance cycle is completed to open the switch S4, and the motor 21 gets stopped under braking action. In a certain time interval designated by TD from the time at which the last sprocket hole in the film 5 traverses the transducer 6, the outputs of the threshold circuits 106' and 108' are changed to "0" levels as is better understood from FIG. 12.

In FIGS. 11 and 12, upon advent of the trailing edge of each pulse from the pulse shaper circuit 105' on an input B of the threshold circuit 106', a transistor Tr1 is turned off to start the charging of a timing capacitor C1 through a resistor 2. A voltage appearing at a junction A between the capacitor C1 and resistor 2 does not exceed a threshold level VT as sensed by a comparator D during the film advance cycle. When no more pulse is fed to the threshold circuit 106', however, the voltage A is permitted to reach the threshold level VT in the time interval TD from the occurrence of the last pulse.

At the reeling end, it often happens that the film 5 gets stopped before the camera is set to the cocked position as shown by a dot-and-dash vertical line (f). As the switch S4 remains closed, the motor winding M continues to be energized. In the threshold time interval TD, however, the outputs of the threshold circuits 106' and 108' are changed to "0" levels simultaneously at a time point (g), causing the NAND gate 109 to produce a "1" level output. As the output of the inverter 116 becomes "1" from the time (c') onward, the output of the NAND gate 110 changes from a "1" to "0" level. This "0" output is applied to both the motor drive control circuit 143 and the display control circuit through the NAND 111 and NOR 120 and through the NOR 125 respectively. The motor winding M is therefore de-energized and the light-emitting diode 135 is lighted up with or without production of sound from the buzzer BZ. In this case, the display section 41 (FIG. 1) in the wall of the back panel of the motor drive unit 20 becomes luminous at the top compartment for read-out of a symbol such as "RETARD" or "REELING END" as shown in FIG. 13.

By reference to the timing chart of FIG. 14B, the film 5 is assumed to be stationary while the film drive mechanism is simultaneously operated by the motor 21 to move at the normal speed, for example, because the forward end of film is not fixedly secured to the take-up spool, or because thoseof the perforations which will engage with the sprocket teeth are broken so that the establishment of driving connection of the sprocket 11 to the film 5 could not be attained. Since two of the three inputs of the NOR gate 120 are connected to the respective switches S2 and S4 through an inverter 119 and directly, and are therefore receptive of "1" signals, the output of NAND gate 111 governs stoppage of the motor 21. Since the film speed responsive threshold circuit 106' produces a "0" output which is unchanged at the time when the output of the sprocket speed responsive threshold circuit 108' changes to a "1" level, the output of the NAND 109 remains at a "1" level. Accordingly, when the output of the single-pulse shaper circuit 141 changes to a "0" level at the time point (c), the NAND gate 111 changes its output to a "1" level at which time the transistor Tr4 is turned off by the "0" output of the NOR gate 120 so as to de-energize the motor winding M.

NOR gate 121 has two inputs connected to the respective outputs of the threshold circuits 106' and 108', and has an output connected through an inverter 122 to both NOR gates 124 and 125 so that when the speed difference occurs, as detected at the time point (b), the light-emitting diodes 134 and 135 are rendered inoperative. NOR gate 126 has two inputs; one of which is connected to the output of the NAND gate 110 and the other of which is connected through an inverter 123 to the output of the threshold circuit 108' upon occurrence of "0" outputs from the NAND gate 110 and the inverter 123 simultaneously at the time point (d) in FIG. 14B to produce a "1" output. This output is applied to a display control circuit 142 for the light-emitting diode 136. At this time, a NOR gate 127 changes its output from a "1" to a "0" level at which a timing capacitor 132 starts to be charged through a resistor 133 from the battery E. During a time interval dependent upon the RC time constant, the light-emitting diode 136 is lighted up so that a left-hand bottom compartment becomes luminous for the read-out of a symbol such as "FILM BLANK" or "DAMAGE".

In the rewinding mode, if the camera is already set in the cocked position where the switch S4 is open, the operator is required at first, to move the control knob 40 to the left so that the main switch S1 is opened, and then to depress the shutter button so that the camera is released to close the switch S4 after or before the control knob 42 and the lever 33 are operated in sequence.

Where an abnormal advance cycle occurs due to the reeling end, there is no need to manipulate the main switch control knob 40 and the shutter release button, since the preliminary actuation of the forward current circuit in 143 is followed by occurrence of a "1" output from the NAND gate 111. When the lever 33 is turned clockwise, a switch S3 is moved to select the transducer C (43 in FIG. 1) for connection with the pulse shaper circuit 107', while the second transducer B is cut off therefrom and at the same time the switch S2 is also made on.

With reference to the timing chart of FIG. 14C, after the sprocket shaft 12 is taken out of operative connection with the gear 10 when the main switch S1 is closed again, the switch S2 produces a "0" output as shown on a first line in FIG. 14C. Responsive to this output, the NOR gate 112 produces a "1" output which is applied to the transistor Tr1 of the circuit 143. Thus, the motor 21 is caused to rotate in the reversed direction with a current flowing through the winding M in a direction indicated by an arrow II. This "1" output is also applied through the inverter 119 to the NOR gate 120. The closure of the main switch S1 also causes production of a phase difference compensating signal from the circuit 141 as shown on a second line in FIG. 14C.

Now assuming that the speeds of the film 5 and the drive gear 36 reach the threshold level within the duration of the pulse 141, then the outputs of the NAND gate 109 and the inverter 116 simultaneously have a "0" level. Since the output of the switch S2 is also of a "0" level, all the inputs of a NOR gate 117 become "0" so that the flip-flop 118 which was reset in the preceding time of rewinding operation is set with a "1" output appearing at Q. This output renders the light-emitting diode 134 inoperative.

At a time when the trailing edge of the film has passed across the transducer A, the output of the circuit 106' changes to a "0" level after the time interval TD as shown on a third line in FIG. 14C and, therefore, the NAND gate 109 changes its output from a "0" to a "1" level. The inputs of the NAND gate 110 are "1" and "1" with resultant production of a "0" output. The inputs of the NAND gate 111 are "1" and "0" with production of a "1" output. The inputs of the NOR gate 112 are "0" and "1" so that the motor winding M is de-energized. On the other hand, the output of the inverter 123 is "0". The inputs of NOR gate 126 are "0" and "0" with production of a "1" output which actuates the timer circuit 142 controlling the period of energization of the light-emitting diode 136 as shown on the bottom line in FIG. 14C. In this case, the display of FIG. 13 becomes luminous at a right-hand bottom compartment for read-out of a symbol such as "RUN UP" or "SAFE". It is noted here that, as shown on a fourth line in FIG. 14C, the speed of the rewind control gear 36 drops below the threshold level during a time interval equal to twice the TD from the time at which the trailing edge of the film 5 traverses the transducer 6. Therefore, the provision of a film tap of certain length can be secured for the exposed film patrone 14 to facilitate the later handling of the film in development.

Alternatively, assuming that the necessary manipulation of the control knob 42 for the rewind button 12 is overlooked, then the threshold circuits 106' and 108' remain unchanged in output from a "0" level. Upon advent of the trailing edge of the single pulse from the circuit 141 on the NAND gate 110, the output of the NAND gate 110 is changed to a "0" level. The inputs of the NAND gate 111 are "1" and "0" with resultant production of a "1" output. The inputs of the NOR gate 112 are "0" and "1" with production of a "0" output causing stoppage of the motor 21. On the other hand, such change of the output of the circuit 141 does not cause the flip-flop 118 to be set since the output of the NAND gate 109 remains at "1" level. At the time when the duration of the single pulse is terminated, therefore, all the inputs of the NOR gate 124 are simultaneously "0" so that the light-emitting diode 134 is lighted up to read out the symbol "REWIND LATCHED", or "FILM RETARD", as shown on a sixth line in FIG. 14C and in an intermediate compartment of the display panel in FIG. 13. After the rewinding operation has been completed, the operator will turn the lever 33 counterclockwise to set the camera in the winding mode. At this time, the opening of the switch S2 results in application of a voltage +E to a differentiation circuit including a capacitor 129. The output of the differentiation circuit is applied through a terminal 139 and terminal 138 connection to the "reset" input of the flip-flop 118.

The film winding and rewinding error information indicated by the display elements or light-emitting diodes LED134, LED135 and LED136 is summarized in the following table.

| Mode | LED134 | LED135 | LED136 |
| --- | --- | --- | --- |
| Wind | OFF | Reeling End or Film Retard | Film Blank or Film Slip |
| Rewind | Rewind Latched or Film Retard | OFF | Rewind Run Off |

It is to be noted that LED136 is utilized in both modes, and some provision must be made to selectively render luminous the compartments for LED136.

In the above described embodiment of the present invention, the display section is arranged on the surface of the motor drive unit, but it may be arranged in the camera finder. Further, the light-emitting diodes may be operated in various ways, for example, by continuous energization, or intermittent energization for a time interval with or without limitation. In FIG. 10, when the transistors Tr7, Tr8 and Tr9 of the display circuit are turned on, signals appearing at their collectors Co1, Co2 and Co3 may be utilized to actuate the warning buzzer circuit 144. This enables a tone of sound to be heard in combination with the optical display. In the circuit 144, an astable multivibrator of known construction is indicated at 137, and its output makes the buzzer sound.

In the film drive device of the present invention, the above-mentioned detection signals are utilized as digital signals in various controls. That is, at a given time, there is a motor rotation command pulse, then when a film drive pulse and a film advance pulse enter, it is certain that a steady film advancement by the film drive is performed. The motor rotation command pulse is a pulse produced by the closure of such a circuit so that rotation of the motor is performed. In both winding and rewinding, the pulses produced from different circuits have the same characteristics.

The film drive pulse is taken from a movement of a mechanism which drives the film, or of a member cooperative with the mechanism. In the winding up mode, it is taken from a sprocket or a member cooperative with the sprocket. In the rewinding mode, it is taken from a patrone shaft or a member cooperative with the patrone shaft. In this case, also, even when the place and method at and by which the pulse is detected is different, the pulse is of the same characteristics as the film drive pulse.

The film advance pulse detects directly the advancement of the film. This may be performed either in direct contact with the film, or spaced apart from the film. In practice, it is certain and straightforward to detect movement of the perforation of the film. Therefore, at least one detector is placed in an arbitrary position between outer and inner rails (above the aperture) of the camera. When it is placed above the aperture, the loading of the film in the camera leads to the safe arrangement of the film with respect to the detector, because the leader portion of the film is narrower in width, and lacks perforations to ensure that the operator attaches the film to the take-up spool without failure. As to the automatic stoppage when in the rewinding mode, the absence of perforations on the film advance detector does not refute the fact that the film is left unwound in a length corresponding to one frame. When the automatic stoppage is controlled at this point, it is possible to prevent the film from being entirely retracted into the patrone by the inertia. As in the above, there is an advantage in the arrangement of the film advance detector between the upper-outer and inner rails above the aperture. Further, this film advance detector can be utilized as either one of the film motion detectors in the winding and rewinding modes. The film motion detection in the winding and rewinding modes may be made by separate detectors. The provision of two detectors of the same function is, however, space-consuming and expensive.

Figure 15:
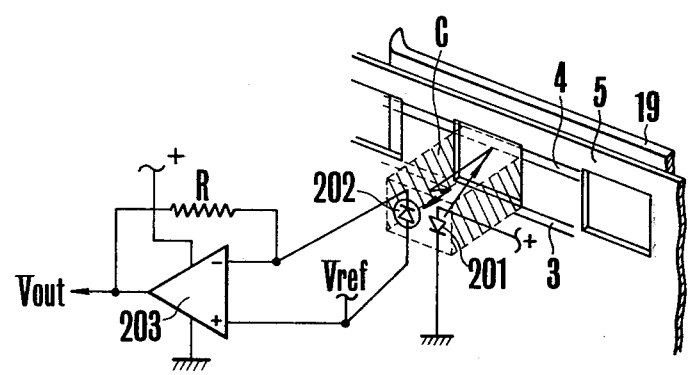
FIG. 15 shows a modification of the detection means for detecting the film movement.
Figure 16:
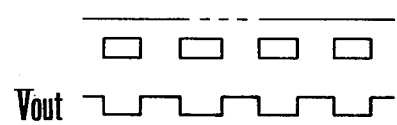
FIG. 16 shows the relation between the film perforation and the pulses omitted from the amplifier in FIG. 15.

FIG. 15 shows a modification of the transducer 6 for detecting the film movement. In the figure, the transducer 6 for detecting the film movement comprises an infrared emission diode 201 and a photoelectric-cell 202, for example, photodiode cell "SPC" contained in a tubular member C having an opening and a width same as the film perforation. The wave length of the infrared emission diode 201 is about 9000Å while the wave length to which the film is sensitive is 3000–7000Å. Therefore, the film 5 is not sensitive to the light of the infrared emission diode 201. In this modification, the infrared light emitted from the infrared emission diode 201 and reflected on the film or by the pressure plate 19 is detected by SPC 202. The pressure plate 19 is coated black, while the emulsion coated film surface is almost white, so that their reflectivities are different. The width of the opening of the transducer 6 for detecting the film movement is same as the width of the perforation, and pulses V-out having an internal same as the perforation pitch are output through an amplifier 203 and connected to the input of the circuit 105' (see FIG. 16).

It will be seen from the foregoing that the present invention provides a film advance error detection system for synchronizing the operation of the camera mechanism and the motor drive unit by monitoring the speed of the film at any time. This makes it possible to ensure accurate and reliable control of film drive in the winding and rewinding modes. Even if an error has arisen, the drive motor is automatically stopped, and the type of error may be determined by the operator by the indication on the display device.

While the foregoing description and drawings represent the preferred embodiments of the present invention, it will be obvious to those skilled in the art that various changes and modifications may be made therein without departing from the true spirit and scope of the present invention.

What is claimed is:

1. A film automatic winding up and rewinding device comprising:
    (a) a drive source, said drive source having an electric motor for film drive;
    (b) control circuit means, said means being operatively coupled to said film drive source to enable conversion of said drive source from an operative state to an inoperative state;
    (c) a film winding up mechanism, said mechanism acting in cooperation with said electric motor;
    (d) a film rewinding mechanism, said mechanism acting in cooperation with said electric motor in a motion transmitting relation when in a rewinding mode;
    (e) drive state detecting means, said means having a first detecting means arranged to detect a drive state of at least one portion of said film winding up mechanism and capable of producing an electrical signal corresponding to the detected state, and a second detecting means arranged to detect a drive state of at least one portion of said film rewinding mechanism and capable of producing an electrical signal corresponding to the detected state;
    (f) film motion detecting means, said means being capable of operatively detecting movement of a film itself to produce a second electrical signal as the detection output;
    (g) discriminating circuit means coupled to said drive state detecting means and film motion detecting means for forming a control signal based on at least one of said electrical signals, said discriminating circuit means being coupled to said control circuit means upon occurrence of an abnormal state in the film winding mode or in the film rewinding mode to automatically stop said drive source by said control signal; and
    (h) indicating means connected to the discriminating means for indicating a normal or an abnormal film winding or rewinding condition in response to the control signal, the indicating means having a plurality of indicating members, one of which indicating the normal condition when the rewind operation is completed and another indicating the abnormal condition when the rewind operation is interrupted or the rewind operation is not started.

2. A film automatic winding up and rewinding device according to claim 1, further including winding up and rewinding mode changeover means, said means having operating means operable for changeover and either one of said first detecting means and said second detecting means being selectively coupled to said discriminating circuit means in response to said operating means.

3. A film automatic winding up and rewinding device according to claim 1, wherein said film motion detecting means has a detecting element having electrodes arranged in opposed relation with respect to perforations of the film.

4. A motor drive unit usable with a camera having a detecting device for detecting movement of a film to produce a detection signal, said unit having:
    (a) a housing;

(b) an electric motor incorporated in said housing;
(c) a winding up mechanism for being coupled to said electric motor in motion transmitting relation;
(d) rewinding operating means, said means being provided outside of said housing to be operable for mode changeover;
(e) a rewinding mechanism, said mechanism being constructed in operatively couplable relation to said rewinding operation means to be coupled in motion transmitting relation to said motor when in the rewinding mode, and said mechanism having a rewinding connection means arranged in a connection plane between the housing and said camera to be coupled with the camera side for motion transmission;
(f) drive state detecting means, said means being a detection element for forming an electrical signal corresponding to a drive state of at least one portion of said rewinding mechanism;
(g) signal terminating means, said means having connection terminals on said housing to receive the film motion detection signal from the camera side;
(h) discriminating circuit means, said means being coupled to said drive state detecting means and signal terminal means for forming a control signal when an abnormal rewinding state corresponding to at least one of the signals occurs;
(i) control circuit means, said means being operatively coupled to said motor and to said discriminating circuit means, so that the motor drive is stopped by its control signal; and
(j) indicating means connected to the discriminating means for indicating a normal or an abnormal film winding or rewinding condition in response to the control signal, the indicating means having a plurality of indicating members, one of which indicating the normal condition when the rewind operation is completed and another indicating the abnormal condition when the rewind operation is interrupted or the rewind operation is not started.

5. A motor drive unit according to claim 4, wherein said rewinding mechanism has a clutch means for clutching by said operating means, and said detection element is operatively connected to one portion of said rewinding mechanism between said clutch means and said motor; and wherein said control circuit means has a compensation circuit for forming a control signal for holding said motor in the drive state for a predetermined time from the start of movement of said motor to at least the time at which the film rewinding starts after said clutch means is set in a motion transmitting state.

6. A motor drive unit according to claim 4, further including:
a delay circuit coupled to said discriminating circuit means; and
indicating means coupled to said timer circuit to extinguish the display of the film automatic rewinding completion upon elapse of a predetermined delay time.

7. A film drive device for a photographic apparatus having a film winding up mechanism, a film moving area through which film is wound, the area being arranged to be invisible from the apparatus, and film movement detection means positioned at the moving area for detecting the movement of the film at the area and producing a detection signal, the drive device comprising:

(a) a film drive source, the drive source having an electric motor;
(b) control circuit means, the circuit means being operatively coupled to said motor to control;
(c) a film drive mechanism drivingly coupled to said drive source, the mechanism being operatively connected to the winding up mechanism;
(d) detecting means for detecting the operating state of at least one portion of the drive mechanism and producing a state-related signal;
(e) discriminating circuit means operatively connected to the detecting means and the film movement detection means for producing at least two control signals based on at least one of the detection signal and the state-related signal upon occurrence of an abnormal condition or normal winding up completion condition of the film movement or the drive mechanism;
(f) indicating means connected to the discriminating circuit means for indicating the abnormal condition, the indicating means having a plurality of indicating elements, one of which indicating one type of abnormal film winding condition and another of which indicating other types of abnormal conditions;
(g) said indicating means responsive to one of said control signals for selectively indicating the abnormal condition or indicating the normal condition by one of the control signals; and
(h) said detection means sensing a perforated portion and non-perforated portion of the film so that the movement of the film is detected when the film is moved.

8. A film drive device according to claim 7, wherein said control circuit means is provided with a compensation circuit, said circuit holding said drive source in a driving state for a predetermined time from the start of movement of said drive source to the time at which the film starts to move.

9. A film drive device according to claim 7, wherein said control circuit means further includes warning sound producing means, said means being coupled to said discriminating circuit upon occurrence of an abnormal condition in film drive mode to produce a warning sound.

10. A film drive device according to claim 7, wherein said driving mechanism includes gear means and said first detecting means having a detecting element for detecting either electrically or optically the toothed portion of said gear means.

11. A film drive device according to claim 7, wherein said second detecting means includes irradiation means for producing a radiation the wavelength of which is non-sensitive for a photographing film and a detector for receiving the reflected radiation from a film.

12. A film drive device according to claims 10 or 11, including a holding circuit connected to said detecting means for holding output signals from said detecting means.

13. An automatic rewinding device for a photographic apparatus having a film patrone loading chamber in which the film patrone is loaded and from which photosensitive film is wound and thereafter the wound film is rewound in the patrone and an invisible film moving area through which the photosensitive film is wound and rewound, the device comprising:
(a) a film drive source;

(b) control circuit means operatively connected to the drive source;

(c) a film rewinding mechanism, the mechanism operatively coupled to the drive source in motion transmitting relation, so that the wound film can be rewound;

(d) film motion detecting means for detecting the rewinding movement state and forming a first electrical signal, the detecting means being positioned at the moving area predeterminedly spaced from the loading chamber;

(e) drive state detecting means operatively coupled to a portion of the rewinding mechanism for forming a second signal in response to the operating or non-operating state;

(f) discriminating circuit means connected to both detecting means for forming a control signal based on the first signal and second signal, the circuit means being operatively connected to the control circuit means to automatically interrupt film rewinding, so that the leading edge of the film is positioned between the entrance of the film patrone and the film motion detecting means at the rewinding interruption; and (g) indicating means, connected to the discriminating circuit means, for indicating an abnormal or a normal film winding condition, the indicating means having a plurality of indicating members, one of which indicating the normal condition when the rewind operation is completed and another indicating the abnormal condition when the rewind operation is interrupted or the rewind operation is not started.

14. A film electrically-operated automatic rewinding device according to claim 13, further including:

a timer circuit coupled to said discriminating circuit means; and indicating means coupled to said timer circuit upon elapse of a predetermined delay time to display the film automatic rewinding completion.

15. A film electrically-operated automatic rewinding device according to claim 13, wherein said control circuit means is provided with a compensation circuit for holding said drive source in a driving state for a predetermined time from the start of movement of said drive source to at least the time at which the film rewinding movement starts.

16. A film electrically-operated automatic rewinding device according to claim 13, further including:

a rewinding mode memory circuit electrically coupled to said film motion detecting means and said drive state detecting means upon attainment of rewinding from the normal mode state for electrically memorizing said mode; and display means operativley coupled to said memory circuit, said means outwardly displaying the rewinding mode to be memorized in said memory circuit.

17. A film drive device for a photographic apparatus having a film winding up mechanism, a film moving area through which the film is wound, the area being arranged to be invisible from the apparatus, and film detection means positioned at the moving area for producing a detection signal in response to the stoppage of the film, the drive device comprising:

(a) a housing detachably mountable on the photographic apparatus;

(b) a drive source, said source having an electric motor;

(c) control circuit means operatively connected to the motor to control supply of power to the motor;

(d) a film drive mechanism drivingly coupled to the drive source and couplable to the film winding up mechanism;

(e) signal terminal means having at least one connection terminal on the housing to receive the detection signal;

(f) state detecting means for detecting the operating and non-operating state of at least one portion of the drive mechanism and producing a state-related signal;

(g) discriminating circuit means connected to the signal terminal means and the state detecting means for producing at least two control signals based on at least one of the detection signal and the state-related signal upon occurrence of an abnormal condition or normal winding up completion condition of film stoppage or the drive mechanism;

(h) indicating means connected to the discriminating circuit means for indicating the abnormal condition based on the control signal, the indicating means having a plurality of indicating elements, one of which indicating one type of abnormal film condition and another of which for indicating other types of abnormal conditions;

(i) said indicating means responsive to one of said control signals for selectively indicating the abnormal or indicating the normal condition by one of the control signals; and (j) said detection means sensing a perforated portion and non-perforated portion so that the movement of the film is detected when the film is moved.

* * * * *